US012754754B2

(12) United States Patent
Yang et al.

(10) Patent No.: US 12,754,754 B2
(45) Date of Patent: Oct. 6, 2026

(54) SYSTEMS AND METHODS FOR DATA STORAGE MANAGEMENT

(71) Applicant: Samsung Electronics Co., Ltd., Suwon-si (KR)

(72) Inventors: Qirui Yang, San Diego, CA (US); Bridget Davis, San Diego, CA (US); Devasena Inupakutika, Rockville, MD (US); Peter Chen, San Diego, CA (US); Thomas Rainey, San Diego, CA (US); Terence Wong, San Diego, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 593 days.

(21) Appl. No.: 18/202,627

(22) Filed: May 26, 2023

(65) Prior Publication Data

US 2024/0281274 A1 Aug. 22, 2024

Related U.S. Application Data

(60) Provisional application No. 63/446,249, filed on Feb. 16, 2023.

(51) Int. Cl.
*G06F 9/455* (2018.01)

(52) U.S. Cl.
CPC .................... *G06F 9/45558* (2013.01); *G06F 2009/45583* (2013.01)

(58) Field of Classification Search
CPC . G01N 27/447; G06F 12/084; G06F 12/0842; G06F 12/0871; G06F 12/109;
(Continued)

(56) References Cited

U.S. PATENT DOCUMENTS 9,639,480 B2 5/2017 Waldspurger et al.
10,346,193 B1 * 7/2019 Dalal .................. G06F 12/0842
(Continued)

FOREIGN PATENT DOCUMENTS

CN 107463509 B 12/2020
WO WO 2017/211247 A1 12/2017
WO WO 2022/164490 A1 8/2022

OTHER PUBLICATIONS

Liu, Weiguang, et al., "MLCache: A Space-Efficient Cache Scheme based on Reuse Distance and Machine Learning for NVMe SSDs," 2020 IEEE.ACM International Conference on Computer Aided Design (ICCAD), Nov. 2020, 9 pages.
(Continued)

*Primary Examiner* — Arpan P. Savla
(74) *Attorney, Agent, or Firm* — Womble Bond Dickinson (US) LLP

(57) ABSTRACT

Systems and methods for managing a storage device are disclosed. A first amount of a first storage device is associated to a first client. A first request associated with first data is detected, and a second request associated with the first data is also detected. A log for the first request and the second request is maintained for the first client. A trigger condition is identified, and based on identifying the trigger condition, a value is computed based on the log. A second amount of the first storage device is determined based on the value, and the second amount is associated to the first client.

16 Claims, 10 Drawing Sheets

(58) Field of Classification Search
CPC ... G06F 2009/45583; G06F 2212/1024; G06F 2212/1041; G06F 2212/152; G06F 2212/222; G06F 2212/282; G06F 2212/314; G06F 2212/502; G06F 2212/601; G06F 2212/657; G06F 3/061; G06F 3/0631; G06F 3/067; G06F 3/0685; G06F 9/45558; G06F 3/0604; G06F 3/0608; G06F 3/0614; G06F 3/064; G06F 3/0658; G06F 12/0802; G06F 2212/1016; G06F 2212/1032; G06F 2212/214
See application file for complete search history.

(56) References Cited

U.S. PATENT DOCUMENTS

2014/0013059 A1 1/2014 Joshi et al.
2015/0067262 A1 3/2015 Uttamchandani et al.
2018/0052630 A1 2/2018 Peng et al.
2018/0260330 A1* 9/2018 Felter .................... G06F 9/5016
2019/0243762 A1 8/2019 Birke et al.
2021/0109861 A1 4/2021 Yin et al.
2022/0107743 A1* 4/2022 Yang ....................... G06F 3/061

OTHER PUBLICATIONS

Zhang, Yu, et al., "OSCA: An Online-Model Based Cache Allocation Scheme in Cloud Block Storage Systems," Proceedings of the 2020 Usenix Annual Technical Conference, Jul. 15-17, 2020, pp. 785-798.
Koller, Ricardo, et al., "Centaur: Host-side SSD Caching for Storage Performance Control," 2015 IEEE 12th International Conference on Autonomic Computing, 2015, pp. 51-60.
EPO Extended European Search Report dated May 14, 2024, issued in European Patent Application No. 24150715.1 (11 pages).

* cited by examiner

| Time | 0 | 1 | 2 | 3 | 4 | 5 | 6 |
|---|---|---|---|---|---|---|---|
| Ref. Blk | A | D | A | A | B | C | D |
| Reuse Distance | inf | inf | 1 | 0 | inf | inf | 3 |

400 402 404 402a 402b 402c 402d

FIG. 6

SYSTEMS AND METHODS FOR DATA STORAGE MANAGEMENT

CROSS-REFERENCE TO RELATED APPLICATION(S)

The present application claims priority to and the benefit of U.S. Provisional Application No. 63/446,249, filed Feb. 16, 2023, entitled "ON-DEMAND RACK-SCALE DISAGGREGATED CACHE SYSTEM," the entire content of which is incorporated herein by reference.

FIELD

One or more aspects of embodiments according to the present disclosure relate to data storage devices, and more particularly to managing the data storage devices.

BACKGROUND

An application may interact with a storage device for reading and writing data. Latencies are generally involved in accessing the storage device. In a typical scenario, it may be desirable to store data that is accessed frequently in a storage device that has a lower access latency than a storage device that has a higher access latency. As more than one application may want to store data in the low latency storage device, a storage manager may be needed to allocate use of the storage space.

The above information disclosed in this Background section is only for enhancement of understanding of the background of the present disclosure, and therefore, it may contain information that does not form prior art.

SUMMARY

One or more embodiments of the present disclosure are directed to a method for managing a storage device. The method includes associating a first amount of a first storage device to a first client; detecting a first request associated with first data; detecting a second request associated with the first data; maintaining, for the first client, a log for the first request and the second request; identifying a trigger condition; based on identifying the trigger condition, computing a value based on the log; determining, based on the value, a second amount of the first storage device; and associating the second amount to the first client.

According to some embodiments, the first storage device includes a solid state drive.

According to some embodiments, the first request and the second request is for a same storage location.

According to some embodiments, the log records the storage location for the first request and the second request based on a criterion.

According to some embodiments, the value identifies value for the storage location based on the log.

According to some embodiments, the value identifies a rate of miss events.

According to some embodiments, the determining of the second amount of the first storage device includes: determining that the rate of miss events satisfies a criterion; based on the determining, identifying a second rate of miss events; and identifying the second amount based on the second rate of miss events.

According to some embodiments, the criterion includes a quality of service threshold, and the second amount satisfies the quality of service threshold.

According to some embodiments, the method further includes determining a criterion for a second client; and based on determining the criterion for the second client: associating a third amount of the first storage device to the second client; and changing the third amount to a fourth amount based on the trigger condition.

According to some embodiments, the method further comprises: determining a criterion for a second client; and based on determining the criterion for the second client, associating a third amount of the first storage device to the second client.

One or more embodiments of the present disclosure are directed to a storage device comprising: a storage medium; and a processor coupled to the storage medium. The processor has circuitry for: associating a first amount of a first storage device to a first client; detecting, at a first time period, a first request associated with first data; detecting, at a second time period, a second request associated with the first data; maintaining, for the first client, a log for the first request and the second request; identifying a trigger condition; based on identifying the trigger condition, computing a value based on the log; determining, based on the value, a second amount of the first storage device; and associating the second amount to the first client.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

FIG. 6 depicts a conceptual diagram of an access log according to one or more embodiments;

DETAILED DESCRIPTION

Figure 1:
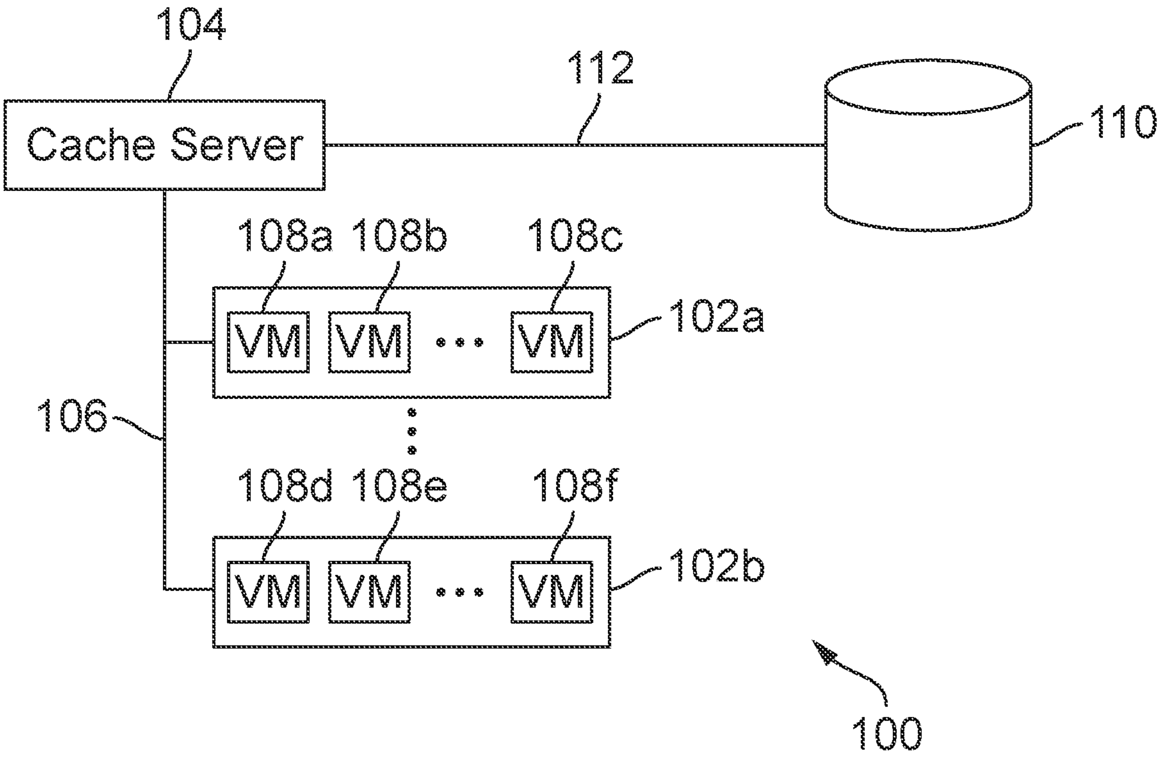
FIG. 1 depicts a block diagram of a computing environment for on-demand data storage management according to one or more embodiments.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

Embodiments of the present disclosure are described below with reference to block diagrams and flow diagrams. Thus, it should be understood that each block of the block diagrams and flow diagrams may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flow diagrams. Accordingly, the block diagrams and flow diagrams support various combinations of embodiments for performing the specified instructions, operations, or steps.

In general terms, one or more applications running on one or more computing devices may need to access a storage device to read and write data. The storage device may be a locally attached storage device and/or a remote storage device (e.g., in a cloud computing environment, data center, or the like). Latencies are generally involved in accessing data from the storage devices. The latencies involved for a remote storage device may be greater than the latencies involved for a locally attached storage device.

One mechanism used to alleviate the latencies associated with remote storage devices may be to use a locally attached storage device as cache storage. For example, frequently accessed data may be stored in the locally attached storage device for faster access. Locally attached cache storage solutions, however, may suffer from unbalanced storage utilization. For example, a first application server may be busy with intensive input/output (I/O) operations, requiring extensive use of its local cache storage, while another server may be idle and have limited used of its local cache storage.

In general terms, embodiments of the present disclosure are directed to systems and methods for managing a storage system according to one or more embodiments. According to some embodiments, the storage system includes one or more storage devices (e.g., solid state drives) which storage capacities may be shared or pooled into a logical universal cache storage device. The storage space provided by the universal cache storage device may be accessible by one or more applications running on one or more virtual or physical machines.

In some embodiments, the storage system includes an on-demand cache manager configured to periodically evaluate use of the universal cache by the one or more applications. The cache manager may adjust allocation of the universal cache based on usage and demand, to satisfy a criterion. The criterion may be a guaranteed quality of service (QOS) for the one or more applications. The periodic adjustment of the allotted cache space may help address the problem of an unbalanced cache, helping improve utilization of the one or more storage devices.

In some embodiments, the cache manager may maintain a history of memory requests (also referred to as access history) from a virtual or physical machine. A reuse distance, may be computed on a periodic basis based on the access history. The reuse distance may provide information on cache hit and miss ratios for one or more storage addresses (also referred to as memory addresses, memory references, or block references). For example, a reuse distance for a memory reference that is bigger than an allocated cache space may indicate a high cache miss ratio.

In some examples, an estimated cache miss ratio may be determined using the access history, by computing a number of cache misses relative to a total number of memory references during a time period. In some embodiments, a miss-ratio curve (MRC) may be generated based on the cache miss ratio history. The MRC may plot the cache miss ratio as a function of cache size.

In some embodiments, an acceptable cache miss ratio may be identified for a client based on a quality of service to be provided to the client. A corresponding cache size may be identified using the MRC in light of the quality of service consideration.

FIG. 1 depicts a block diagram of a computing environment 100 for on-demand data storage management according to one or more embodiments. The computing environment may include one or more computing servers 102 coupled to a cache server 104. In some embodiments, the computing servers 102 are housed in one or a group of racks (not shown) along with the cache server 104. The computing servers 102 and the cache server 104 may communicate with each over an interface 106. In some embodiments, the interface 106 (e.g., the connector and the protocol thereof) may include (or may conform to) a Compute Express Link (CXL), Cache Coherent Interconnect for Accelerators (CCIX), dual in-line memory module (DIMM) interface, Small Computer System Interface (SCSI), Non Volatile Memory Express (NVMe), Peripheral Component Interconnect Express (PCIe), remote direct memory access (RDMA) over Ethernet, Serial Advanced Technology Attachment (SATA), Fiber Channel, Serial Attached SCSI (SAS), NVMe over Fabric (NVMe-oF), iWARP protocol, InfiniBand protocol, 5G wireless protocol, Wi-Fi protocol, Bluetooth protocol, and/or the like.

In some embodiments, the computing server 102 hosts one or more virtual machines (VMs) 108*a*-108*f* (collectively referenced as 108) running one or more applications. An application run by a VM (also referred to as a client) 108 may be any type of application that, during execution, issues I/O requests for writing and/or reading data to and/or from a mass storage system 110. For example, the application may be a big data analysis application, e-commerce application, database application, machine learning application, and/or the like.

The cache server 104 may include one or more cache storage devices that may be used for expediting the handling of the I/O requests from the one or more applications. In some embodiments, the one or more cache storage devices are pooled to form a logical universal cache. The cache space provided by the universal cache may be dynamically allocated to one or more of the VMs for use to store, for example, frequently accessed data.

The mass storage system 110 may store data generated and used by the applications running on the VMs 108. The mass storage system 110 may include any suitable storage device such as, for example, a magnetic storage device (e.g., a hard disk drive (HDD), and the like), solid-state drive (SSD), optical storage device (e.g., a Blue-ray disc drive, a compact disc (CD) drive, a digital versatile disc (DVD) drive, and the like), other kinds of flash memory devices (e.g., a USB flash drive, and the like), and/or the like. In some embodiments, the mass storage system 110 is a cloud block storage system that aggregates different types of storage media into a storage pool. The cloud block storage system may store the data as data blocks. The data blocks may be identified by a memory address such as a logical block number (LBA). In some embodiments, the latency in accessing data from the mass storage system 110 may be higher than the latency in accessing data from the universal cache provided by the cache server 104.

In some embodiments, the VMs 108 issue I/O requests for reading and writing data during execution of the applications. The I/O requests may be processed by the cache server 104. In processing an I/O request (e.g., a data read request), the cache server 104 may determine whether the requested data is stored in the universal cache. In response to determining that the data is stored in the universal cache (e.g., a cache "hit" event), the requested data may be provided from the universal cache.

In response to determining, however, the requested data is not stored in the universal cache (e.g., a cache "miss" event), the cache server 104 may be configured to retrieve the data from the mass storage system 110. The cache server 104 may transmit a request to the mass storage system 100 over a data communications network 112. The data communications network 112 may be a local area network (LAN), storage area network (SAN), wide area network (WAN), the public Internet, and/or the like. For example, in the embodiment where the data communications network 112 is a SAN, the cache server 104 may retrieve the data (e.g., a block of the data) from the mass storage system 110 using an interface such as Internet Small Computer Systems Interface (ISCSI), Rados Block Device (RBD), and/or the like. In some embodiments, the data communications network 112 (e.g., the connector and the protocol thereof) may include (or may conform to) CXL, CCIX, DIMM interface, SCSI, NVMe, PCIe, RDMA over Ethernet, SATA, SAS, NVMe-oF, iWARP protocol, InfiniBand protocol, 5G wireless protocol, Wi-Fi protocol, Bluetooth protocol, and/or the like.

In some cases, the I/O workload generated by the VMs 108 may be inconsistent or skewed. For example, depending on the type of application that is executed, one VM may generate a large amount of I/O requests while another VM may generate a small amount of I/O requests. In some embodiments, the cache server 104 is configured to dynamically adjust the allocation of the universal cache space on a periodic (e.g., regular or irregular) basis, helping improve utilization of the cache space. For example, the cache server 104 may evaluate the rate of cache misses for a VM with a heavy workload, and readjust the cache space allotted to the VM to satisfy a criterion. The criterion may be, for example, a guaranteed quality of service relating to, for example, the rate of cache misses. In some embodiments, the reallocation occurs on an hourly basis.

Figure 2:
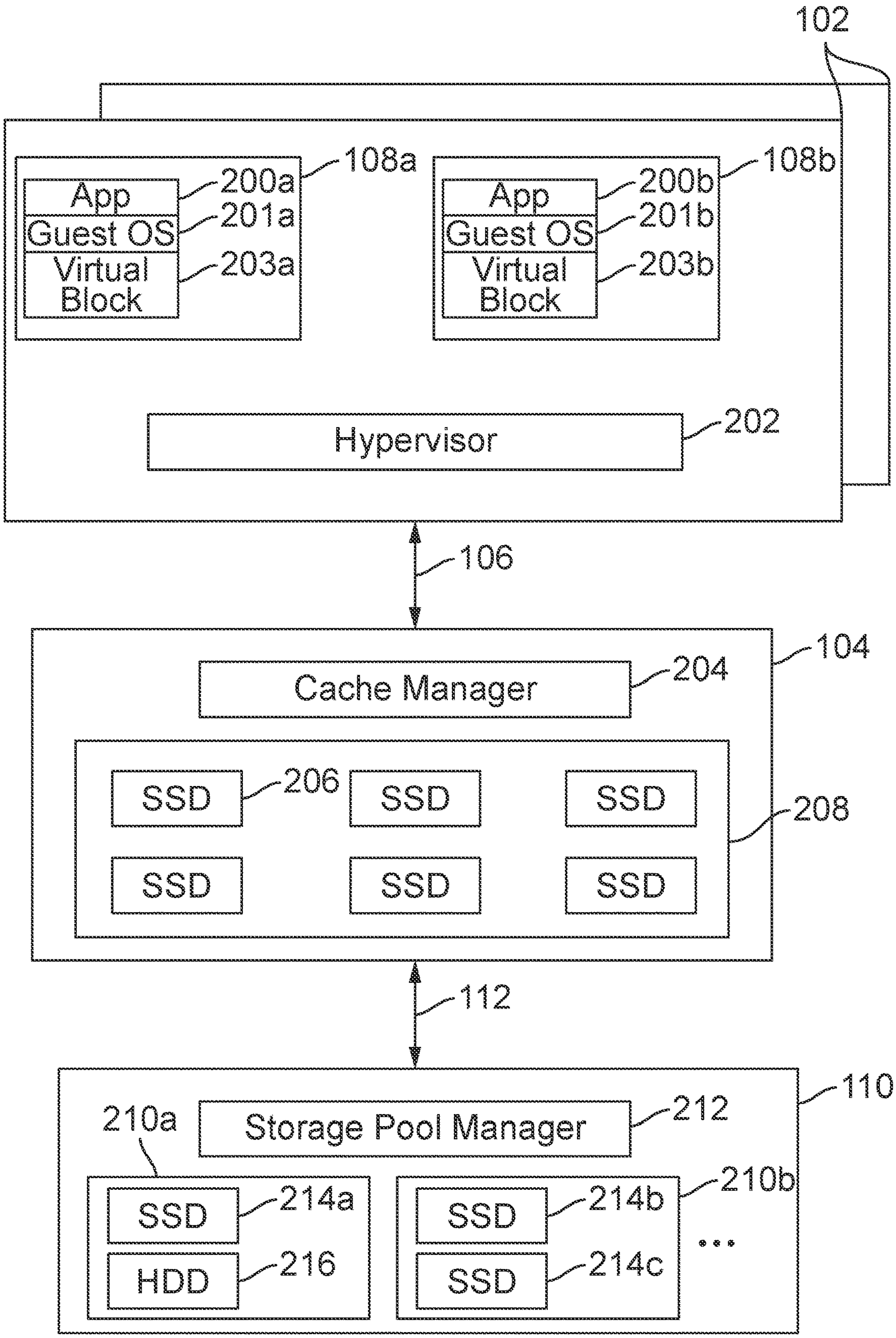
FIG. 2 depicts a block diagram of the computing server, cache server, and mass storage system according to one or more embodiments.

FIG. 2 depicts a block diagram of the computing server 102, cache server 104, and mass storage system 110 according to one or more embodiments. The computing server 102 includes one or more VMs 108 running one or more applications 200*a*, 200*b* (collectively referenced as 200).

A VM 108 may have its own instance of an operating system (OS) referred to as a guest operating system 201*a*, 201*b* (collectively referenced as 201)), virtual block or disk device 203*a*, 203*b* (collectively referenced as 203), and the like. In some embodiments, a hypervisor software 202 may allow the computing server 102 to support multiple VMs 108. In this regard, the hypervisor software 202 may manage allocation of the physical resources of the computing server 102, isolating one VM 108*a* from another. In some embodiments, the hypervisor software 202 implements a device passthrough that allows the VM 108 to access the storage server 104 (e.g., directly), without relying on driver capabilities from the computing server 102.

In some embodiments, the cache server 104 includes a processor and one more storage devices 206. The processor may include computer programming instructions that implement a cache manager 204. In one embodiments, the cache manager manages the I/O requests from the VMs 108 and/or performs other functions of a storage controller.

In some embodiments, the one or more storage devices 206 are disaggregated storage devices that allow their storage space to be shared by the one or more VMs 108. Access to the storage space may be over the interface 106 using a protocol such as NVMe or NVMe-oF. In some embodiments, the storage devices 206 function as cache storage to store, for example, data that may be frequently accessed by the VMs.

In some embodiments, the storage devices 206 include one or more SSDs, although embodiments are not limited thereto, and may include other types of storage devices or media. For example, the storage devices 206 may include CXL memory, solid state cards (SSC), flash drives, flash memory cards, and/or the like. In addition, other protocols in lieu of NVMe may be used for interfacing with the storage devices 206, such as, for example, SATA, SCSI, SAS, and/or other wired or wireless protocol.

In some embodiments, the storage capacity of the one or more cache storage devices 206 is pooled to form a single universal cache 208. The cache space provided by the universal cache 208 may be shared by the one or more VMs or clients 108 to store, for example, frequently access data. In this regard, the cache manager 204 processes a memory access request from a VM to determine whether data associated with the request is stored in the universal cache. In response to the data being stored in the universal cache, the cache manager 204 may retrieve the data from the cache, resulting in a cache hit.

In some embodiments, the cache manager 204 periodically evaluates utilization of the cache by the clients and dynamically adjusts the cache space allocation based on the evaluation. The adjusting may be to meet certain requirements such as QoS requirements.

In some embodiments, the universal cache 208 behaves as a least recently used (LRU) cache or adaptive replacement cache (ARC) for purposes of organizing the cache entries. In this regard, the cache manager 204 may maintain a global LRU or ARC list (collectively referred to as an "LRU list") that spans the one or more storage devices 206. For example, the LRU list organizes the data in order of use by putting a most recently used data block at a head of the list and evicting a least recently used block at the tail of the list.

In some embodiments, the cache manager 204 may be configured to record, in an access log, the history of memory requests for reading or writing data from and to memory addresses identified by the requests. In some embodiments, the access log stores a list of block or memory references organized in a chronological order based on timing of the memory accesses. Separate logs may be maintained for different VMs 108 (or virtual blocks 203).

In some embodiments, the cache manager 204 monitors for a trigger condition. In response to detecting the trigger condition, the cache manager 204 evaluates the information in the access log(s) to determine whether adjustments should be made to the cache space allocation of the universal cache 208. The trigger condition may be passage of a certain period of time (e.g., an hour). For example, the cache manager 204 may, on an hourly basis, evaluate the access log for a VM 108 and compute a cache miss ratio during the hour.

In some embodiments, cache misses may be detected based on reuse distance computations. A reuse distance may be a number of distinct block references that have happened between two block references to the same block location. A cache miss may be determined for a block reference when the reuse distance for the block reference is greater than the allotted cache space. In some embodiments, the reuse distance and/or rate of cache misses may be used to generate a miss-ratio curve (MRC). The MRC may plot the ratio of cache misses as a function of cache size. The MRC may be constructed using, for example, tree-based stack distance calculations such as spatially hashed reuse distances (SHARDS). The cache server 104 may use the MRC to adjust the cache size for the VM 108 to satisfy, for example, a QoS guarantee for the client.

In some embodiments, the cache manager 204 interfaces with the mass storage system 110 for reading and writing data into the system. For example, the cache manager 204 may fetch a block of data from the mass storage system 110 in response to the data not being found in the universal cache 208, resulting in a cache miss event. The mass storage system 110 may include one or more storage servers 210*a*, 210*b* (collectively referenced as 210). A storage server 210 may include one or more non-volatile storage devices including one or more SSDs 214*a*-214*c*, hard disk drives (HDDs) 216, and/or the like, that together may form a storage pool. A storage pool manager 212 may manage the storage pool of the storage servers 210 and communicate with the cache manager 204 to process I/O requests from the cache manager.

Figure 3:
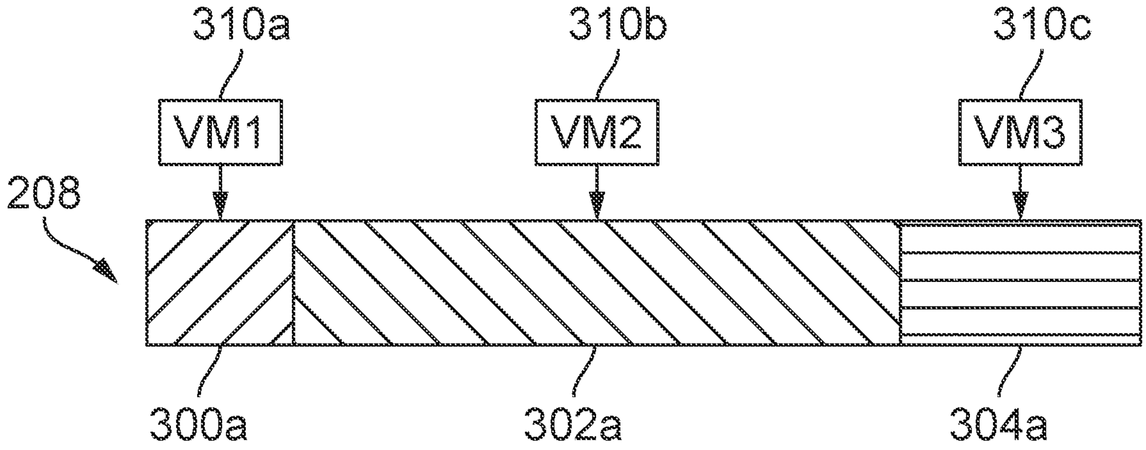
FIGS. 3-5 depict conceptual diagrams of cache space allocation of a universal cache according to one or more embodiments.
Figure 4:
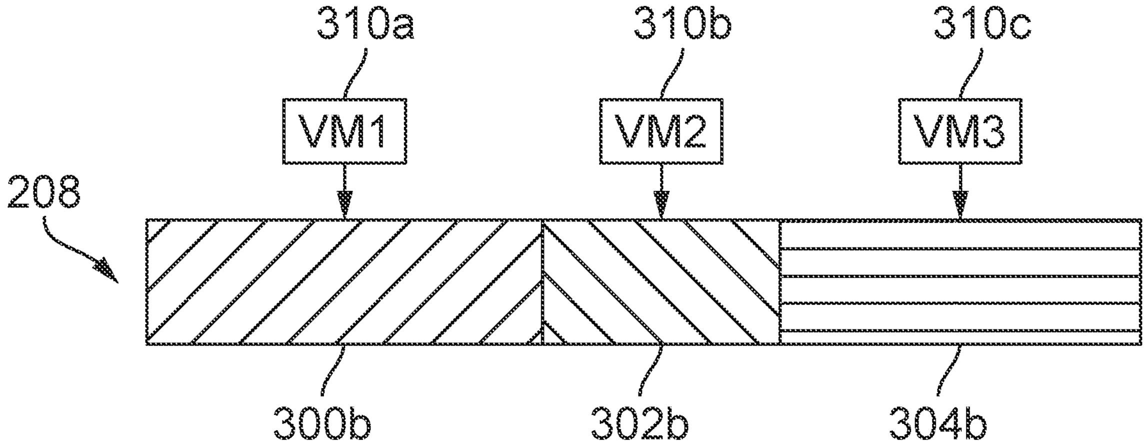
Figure 5:
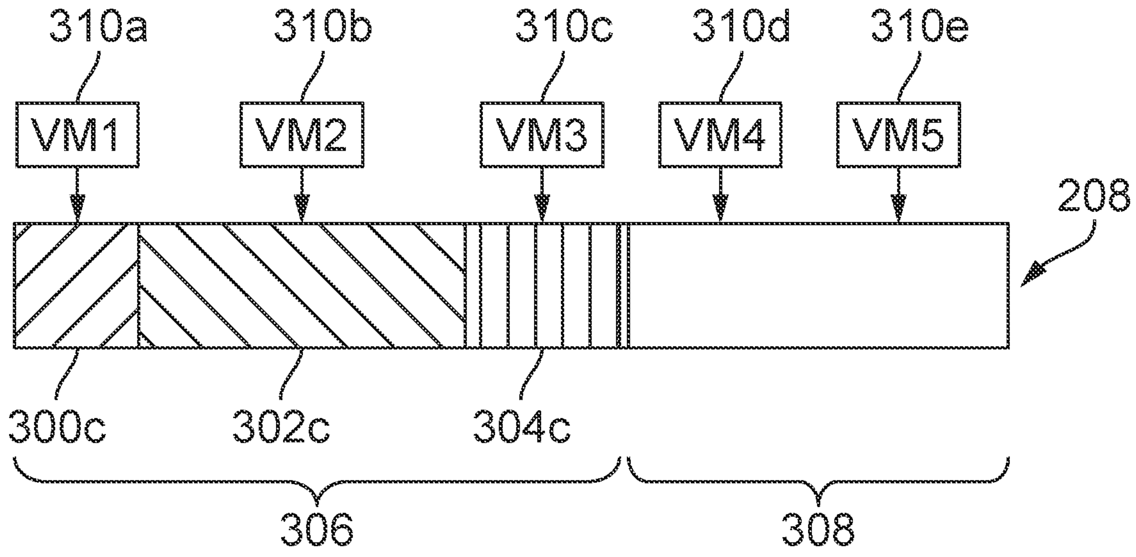

FIGS. 3-5 depict conceptual diagrams of cache space allocation of the universal cache 208 according to one or more embodiments. FIG. 3 depicts a first client 310*a*, second client 310*b*, and a third client 310*c*, that may be similar to the clients 108 depicted in FIG. 1. In the example, of FIG. 3, a first amount of cache space 300*a* (e.g. 10 GB) is initially allocated or assigned to the first client 310*a*, a second amount of cache space 302*a* (e.g. 40 GB) is assigned to the second client 310*b*, and a third amount of cache space 304*a* (e.g., 20 GB) is assigned to the third client 310*c*. Although only three allocations are shown in the example of FIG. 3 for simplicity purposes, a person of skill in the art should recognize that cache space may be allocated to all or a subset of the clients 108 hosted by the one or more computing servers 102.

FIG. 4 depicts the cache spaces of the example of FIG. 3 adjusted in response to an adjustment trigger. In this regard, the cache manager 204 evaluates the block access history for the universal cache 208 and determines a cache size 300*b*, 302*b*, 304*b*, for respectively the first, second, and third clients 310*a*-310*c*. The selected cache size for a client may be based on an acceptable cache miss rate for the client. The acceptable cache miss rate may be based on an QoS guarantee for the client.

In some embodiments, the dynamic adjustment and allotment of the universal cache space may be reserved for clients 108 that satisfy a criterion. For example, the dynamic allotment may be reserved for clients 108 that have been selected by a system administrator. The selection may occur during deployment of the clients based on, for example, importance of the client.

In other examples, the client 108 that is to receive the dynamic allotment of the universal cache space may be automatically selected or recommended by, for example, the cache manager 204. In one example, the cache manager 204 may select one or more of the clients 108 that require QoS guarantees, or that require QoS guarantees above a particular threshold. In some embodiments, the clients that are not selected to receive the dynamic allotment of the cache space may be assigned to a remainder portion of the universal cache 208 that is set aside for the non-selected clients. In this regard, the universal cache 208 may include a first portion that is used for being dynamically allocated to one or more first clients, and a second portion that is statically allocated to one or more second clients.

FIG. 5 depicts an example universal cache 208 with a first portion 306 and a second portion 308. In some embodiments, the first portion 306 is dynamically apportioned to the clients (e.g., clients 310-31*c*) that have been selected to receive the dynamic allotment. In the example of FIG. 5, the first, second, and third clients 310*a*-310*c* are respectively allotted cache size 300*c*, 302*c*, 304*c*. The allotted cache sizes may be based on the access histories of the first, second, and third clients 310*a*-310*c*. The allotted cache sizes may change (e.g., hourly) based on their access histories.

A second portion 308 of the universal cache 208 is statically assigned to the remaining clients (e.g., clients 310*d*, 310*e*) that have not been selected to receive the dynamic allotment. In some embodiments, the first portion 306 and the second portion 308 are statically determined. In some embodiments, the data blocks accessed by clients 310*d*, 310*e* are stored and evicted from the second portion 308 of the cache according to the LRU caching strategy.

FIG. 6 depicts a conceptual diagram of an access log 400 according to one or more embodiments. The access table 400 includes a chronological list of accesses to one or more block of memory references 404 by the cache manager 204. A reuse distance 402 may be computed for a block reference 404 in the access log. In some embodiments, the reuse distance assigned to a block reference may be a number of distinct block references that have happened between a current block reference and a prior block reference to the same block location. In some embodiments, the reuse distance 402 is computed in response to a trigger event that prompts the readjustment of the cache space allocated to one or more VMs 108.

In the example of FIG. 6, an application (e.g., application 200*a*) may issue a request at time 0 to access a block of data in a block location (e.g., block reference A). Because this is the first time that a request for block reference A is received by the cache manager 204, the reuse distance 402*a* assigned to block reference A at time 0 is identified as infinite. The block reference A at time 0 may also be marked as a cache miss.

In the example of FIG. 6, the next request for block A occurs at time 2. In computing the reuse distance for block reference A at time 2, the cache manager 204 determines a number of unique block references between the current reference to block A at time 2, and the prior reference to block A at time 0. In the example of FIG. 6, there is one intervening block reference (block reference D at time 1). Thus, the reuse distance 402*b* assigned to block reference A at time 2 is "1."

In the example of FIG. 6, another request for block A occurs at time 3. Because there are no intervening block references for block A since time 2, a reuse distance 402*c* of "0" is assigned to block reference A at time 3.

A second request for block D occurs at time 6. In computing the reuse distance 402*d* for block reference D, the cache manager 204 detects that there are three unique block references since the request for block D at time 1. Thus, the reuse distance 402*c* assigned to block D at time 6 is "3." The three unique block references between the block reference for block D at time 1 and the block reference for block D at time 6 include a block reference A at time 2, block reference B at time 4, and block reference C at time 5. In some embodiments, the reuse distance is used for detecting a cache miss.

For example, a cache miss is detected in response to a calculated reuse distance for a block reference being greater than the allotted cache size. In the example of FIG. 6, assuming that the allotted cache size is "2," a reuse distance of "3" for block D at time 6 is marked as a cache miss. In some embodiments, the block references having infinite reuse distances are also marked as a cache miss.

In some embodiments, the cache manager 204 uses a first counter to count the number of cache misses based on the computed reuse distances. A cache miss rate may be computed based on ratio of a total number of the cache misses to a total number of block references. In some embodiments, a miss-ratio curve (MRC) may be generated based on the cache miss ratio. The MRC may plot the cache miss ratio as a function of cache size.

Figure 7:
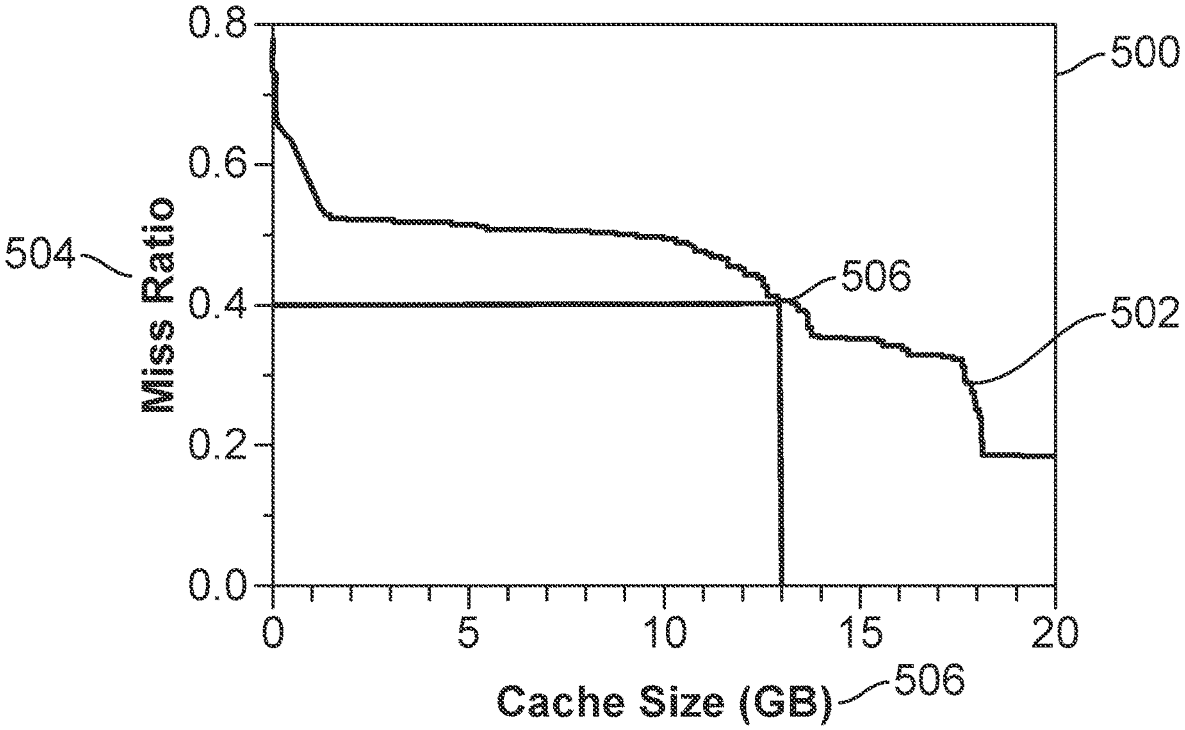
FIG. 7 depicts a graph of a miss-ratio curve plotted as a function of a cache miss ratio and cache size according to one or more embodiments.

FIG. 7 depicts a graph 500 of an MRC 502 plotted as a function of a cache miss ratio 504 and cache size 506 according to one or more embodiments. In some embodiments, the MRC 502 is generated based on the reuse distances computed based on one or more access logs. As depicted by the example MRC 502 of FIG. 7, the cache miss ratio 504 decreases as the cache size 506 increases.

In some embodiments, the MRC 502 is used by the cache manager 204 to determine a soft cache limit for a client 108. The cache limit may be selected based on a criterion. The criterion may be, for example, an acceptable cache miss rate based on service of quality guarantees for the client 108. For example, in response to the maximum cache miss rate allowed for the client 108 being 0.4, the cache size for the client may be adjusted to 13 GB based on point 506 of the MRC 502.

In some embodiments, the cache size selected for a client is a soft cache size that may be adjusted upwards based on use of the universal cache 208 by other clients. For example, a soft cache size limit of 13 GB out of 20 GB may be selected for a client 108 for purposes of satisfying the QoS guaranteed for the client. However, in response to determining that there is additional cache size after allocating the cache space to other clients, the additional cache size may be distributed to one or more clients, so that the cache size allotted to the particular client may be greater than the initially selected cache size. For example, assuming that 13 GB is selected for a first client (e.g., client 108*a*), 1 GB is selected for a second client (e.g., client 108*b*), and 2 GB is selected for a third client (e.g., client 108*c*), the remaining 4 GB of available cache space may be distributed (e.g., evenly or unevenly) amongst one or more of the first, second, and third clients.

Figure 8:
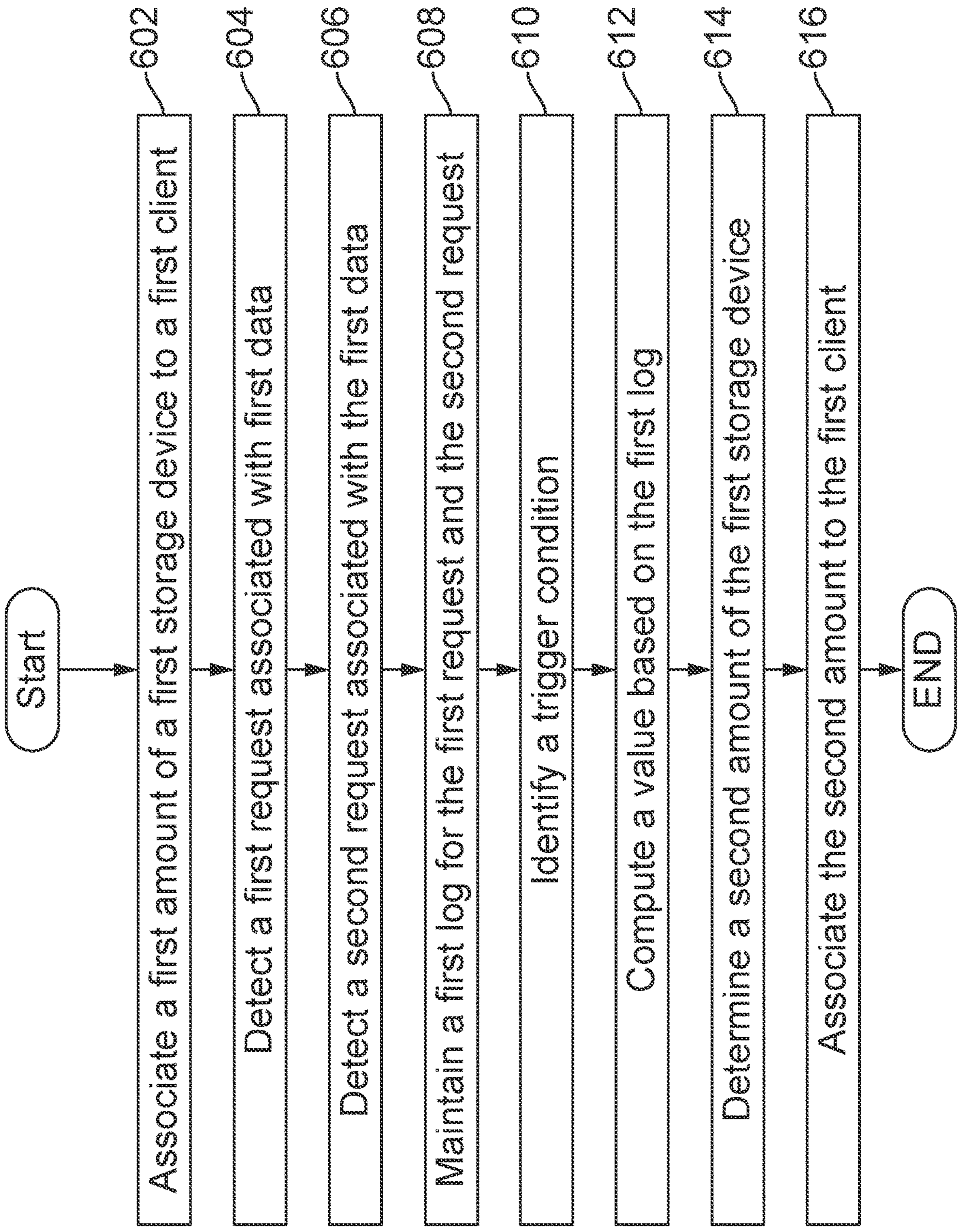
FIG. 8 depicts a flow diagram of a process for on-demand data storage management according to one or more embodiments.

FIG. 8 depicts a flow diagram of a process for on-demand data storage management according to one or more embodiments. The process starts, and in act 602, the cache manager 204 identifies and associates a first amount of a storage device (e.g., the universal cache 208) to a first client (e.g., client 108*a*). The first client may be one that has been selected as qualifying for dynamic allotment of the cache space as described with respect to FIG. 5.

In act 604, the cache manager 204 detects a first request associated with first data. The request may be, for example, an I/O request (e.g., a read request) from the first client at a first time period. In some embodiments, the first request includes a memory reference to a location of the first data stored in a second storage device (e.g., the SSDs 214*a*-214*c* or HDDs 216 in the mass storage system 110). The memory reference may be, for example, a logical block address (LBA) to a data block stored in the second storage device. The first request may result in a cache hit event or a cache miss event depending on whether the first data is stored in the universal cache 208.

In act 606, the cache manager 204 detects a second request for the first data at a second time period later than the first time period. The second request may include the same memory reference for the first data as in the first request. The second request may also result in a cache hit event or a cache miss event.

In act 608, the cache manager 204 records the first request and the second request in an access log. For example, the cache manager 204 may record the block reference information in the first and second request in a chronological order based on the timing of the first and second request. The access log maintained for a first client may be different from the access log maintained for a second client.

In act 610, the cache manager 204 identifies a trigger condition. The trigger condition may be, for example, passage of a certain amount of time that indicates that it is time to reevaluate the cache space allotment to the one or more clients 108.

In act 612, the cache manager 204 computes a value based on the access log. The value may be a rate of miss events computed based on the access history in the access log. In some embodiments, the rate of miss events is based on computing reuse distances of one or more memory references.

In act 614, the cache manager 204 determines a second amount of the storage device (e.g., the universal cache 208) for being allocated to the first client. The second amount may be based, for example, based on QoS considerations for the first client. For example, the cache manager 204 may determine that the rate of miss events computed for the first client violates a guaranteed QoS for the first client. In some embodiments, the cache manager 204 identifies a second rate of miss events that is compliant with the guaranteed quality of service, and identifies a second cache size that is correlated to the second miss rate. In this regard, an MRC may be generated based on one or more access logs, and the second cache size that is correlated to the second miss rate may be identified based on the MRC.

In act 616, the cache manager 204 associates the second amount of the first storage device (e.g., the second cache size) to the first client.

Figure 9:
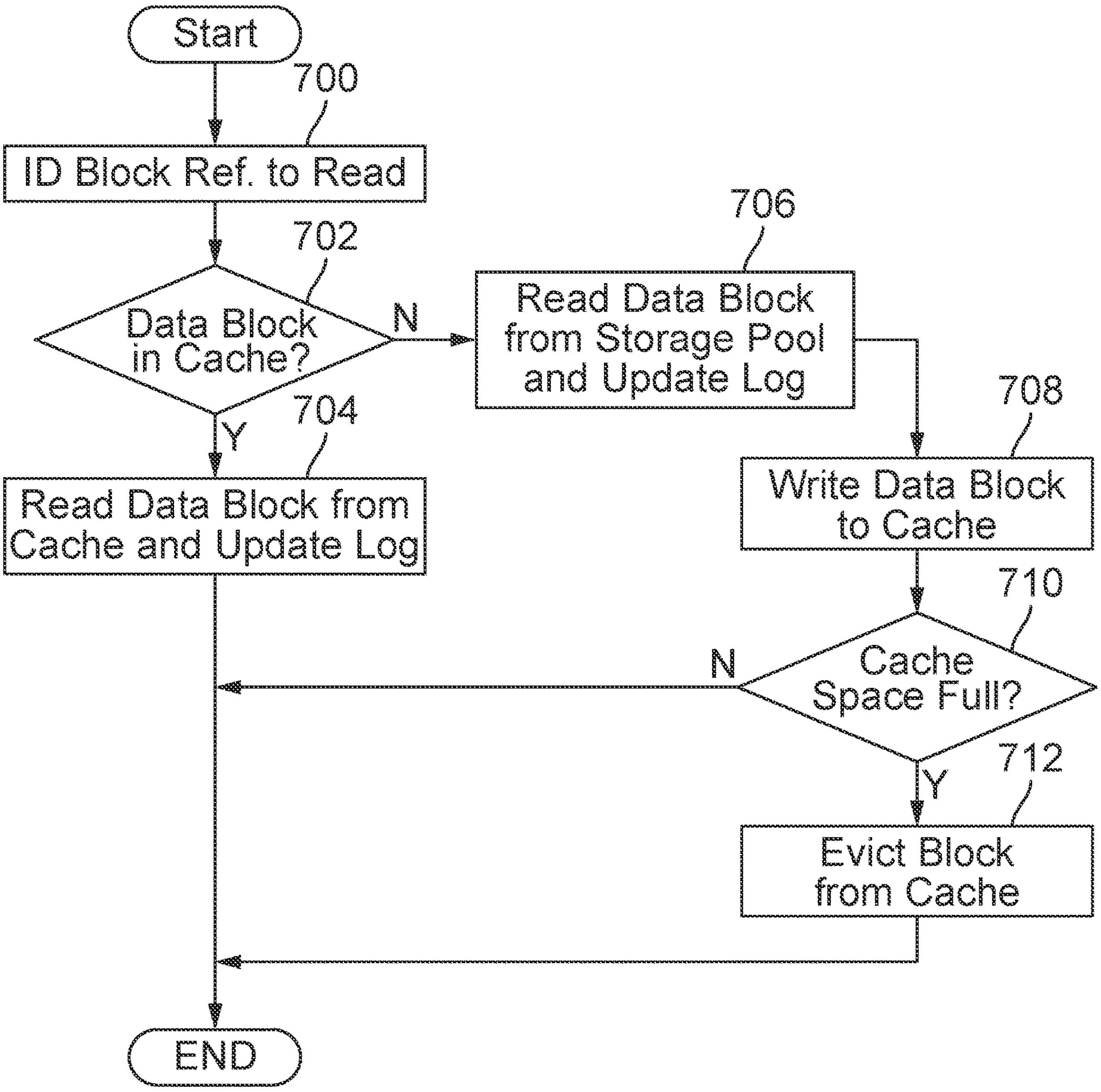
FIG. 9 depicts a flow diagram of a process for processing a read request from a client according to one or more embodiments.

FIG. 9 depicts a flow diagram of a process for processing a read request from a client 108 according to one or more embodiments. The process starts, and in act 700, the cache manager 204 identifies the block reference (e.g., LBA) of the read request.

In act 702, the cache manager 204 determines whether the requested data is stored in the universal cache 208. In this regard, the cache manager 204 searches the cache 208 for the block reference. If the block reference is located in the universal cache 208 resulting in a cache hit, the cache manager 204 reads the associated data block from the universal cache 208, and updates the access log for the requesting client 108 in act 704. The update of the access log may include recording the accessed block reference in chronological order. In some embodiments, the global LRU or ARC is updated by putting the data block at the head of the list.

Referring again to act 702, if the requested block reference is not included in the universal cache 208, the cache manager 204 reads the associated data block from the mass storage system 110 in act 706. In this regard, the cache manager 204 may communicate with the storage pool manager 212 for obtaining the requested data block. The cache manager 204 may further record the block reference in the access log for the requesting client.

In act 708, the cache manager 204 writes the data block to the universal cache 208. In this regard, the global LRU or ARC list may be updated by putting the data block at the head of the list. In some embodiments, the LRU or ARC list further updated with information on the client 108 writing the data block.

In act 710, a determination is made as to whether the cache space allotted to the client 108 is full. In this regard, the cache manager 204 may retrieve the cache information of the requesting client 108 including, for example, the cache size allotted to the requesting client 108. If the cache size allotted to the client is full, a data block corresponding to the client 108 is evicted in act 712. For example, the cache manager 204 evict the data block corresponding to the client that is at the tail of the list.

Figure 10:
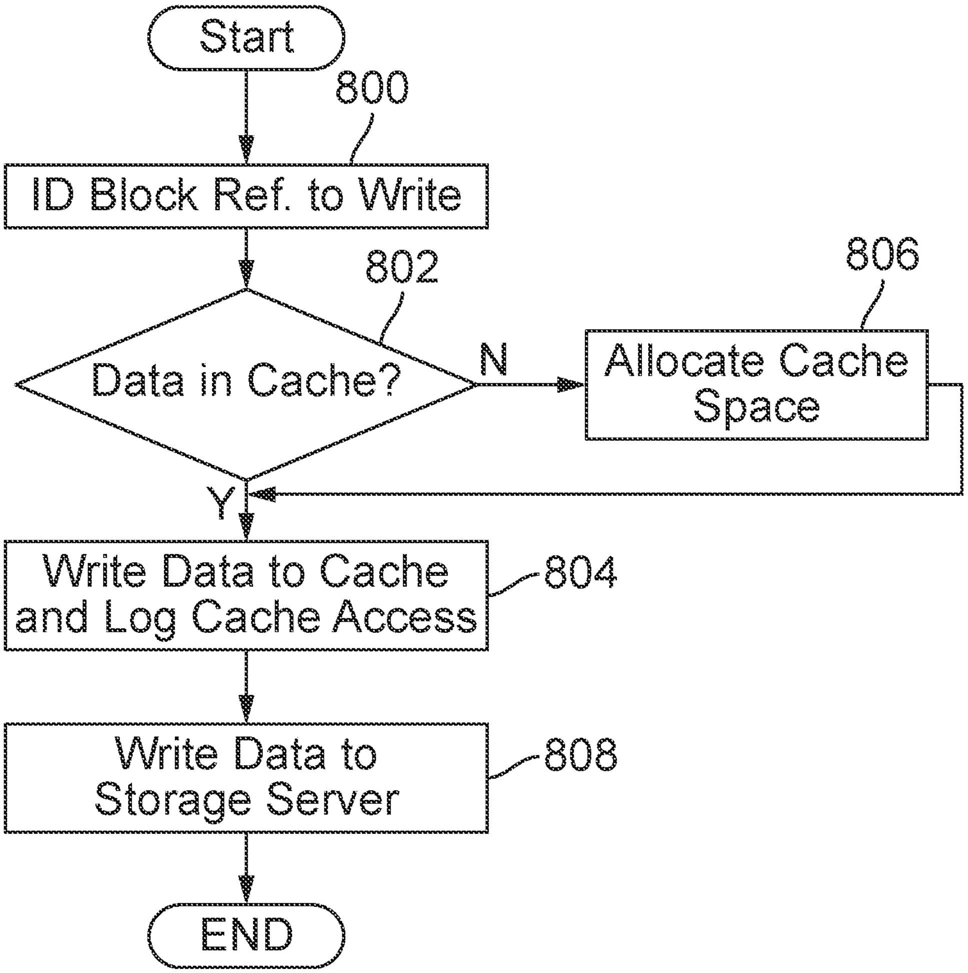
FIG. 10 depicts a flow diagram of a process for processing a write request from a client according to one or more embodiments.

FIG. 10 depicts a flow diagram of a process for processing a write request from a client 108 according to one or more embodiments. The process starts, and in act 800, the cache manager 204 identifies the block reference (e.g., LBA) of the write request.

In act 802, the cache manager 204 determines whether the requested data is stored in the universal cache 208. In this regard, the cache manager 204 searches the cache 208 for the block reference. If the block reference is located in the universal cache 208 resulting in a cache hit, the cache manager 204 writes the data to the allotted cache space in the universal cache, and updates the access log for the requesting client 108 in act 804. The update of the access log may include recording the accessed block reference for the requesting client 108. In some embodiments, the global LRU or ARC is updated by putting the data block at the head of the list.

Referring again to act 802, if the requested block reference is not included in the universal cache 208, the cache manager 204 allocates cache space in act 806.

In act 808, the cache manager 204 provides the data to the storage server 210 for writing the data in a non-volatile device at the address identified by the block reference.

Figure 11:
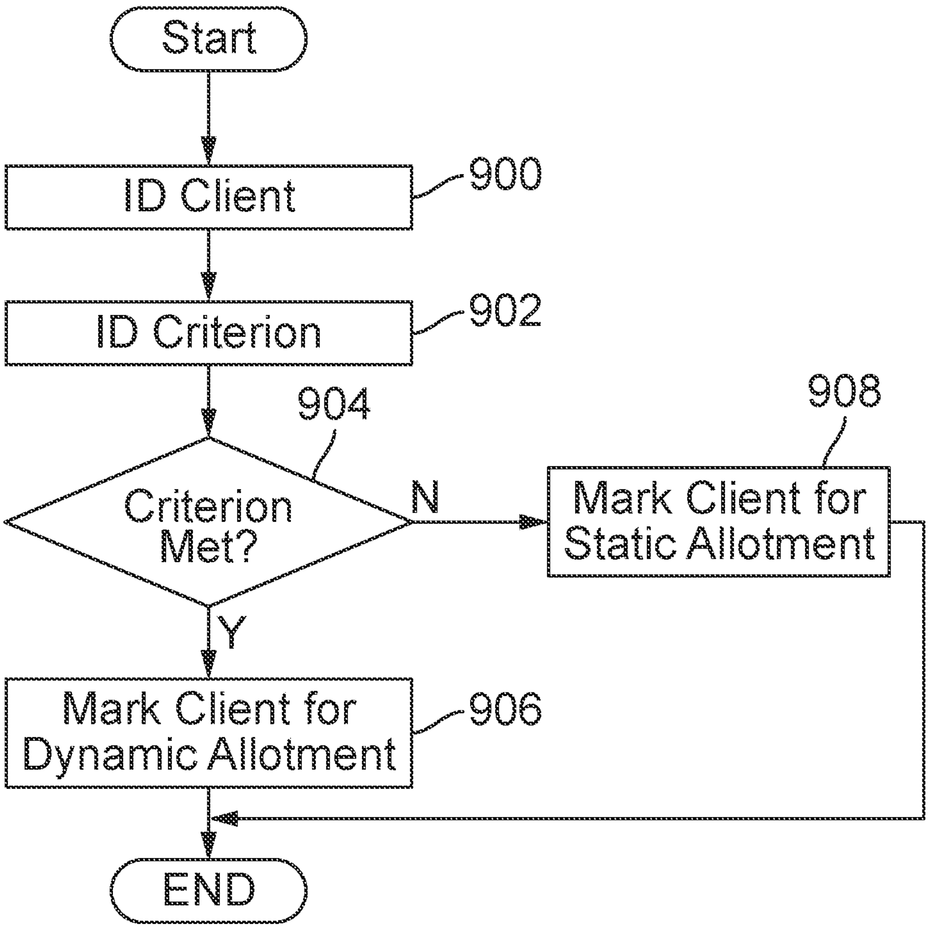
FIG. 11 is a flow diagram of a process for selecting clients that are to be subject of dynamic adjustment of the cache space according to one or more embodiments.

FIG. 11 is a flow diagram of a process for selecting clients that are to be subject of dynamic adjustment of the cache space according to one or more embodiments. The process starts, and in act 900, a client 108 is identified by, for example, the computing server 102. For example, the client 108 may be identified during deployment of the client.

In act 902, a criterion is identified for the client 108. The criterion may be, for example, QoS information associated with the client 108. Another criterion may be, for example, a rank assigned to the client 108. Yet another criterion may, for example, a flag value set for the client 108.

In act 904, a determination is made as to whether the criterion has been satisfied. For example, the computing server 102 may determine that the criterion has been satisfied if the client requires QoS guarantees, or requires QoS guarantees above a first threshold value. In some embodiments, the criterion may be satisfied if the rank assigned to the client 108 is above a second threshold value. In a further example, the criterion may be satisfied if the flag is set for the client 108. The flag may be set by an administrator to indicate that the client 108 is to get the benefit of a dynamically allotted cache size as described above.

If the criterion has been satisfied, the client is marked and further selected, in act 906, as getting the benefit of a dynamically allotted cache size. In this regard, the client may be allotted the portion of the cache space (e.g., the first portion 306 of FIG. 5) that is to be used by clients with dynamically allotted cache sizes.

If the criterion has not been satisfied, the client is marked and further selected, in act 908, as receiving a static allotment of the cache size. In this regard, the client may be allotted the portion of the cache space (e.g., the second portion 308 of FIG. 5) that is to be used by clients with statically allotted cache sizes.

It should be appreciated that the sequence of steps of the processes depicted in the flow diagrams above are not fixed, but can be modified, changed in order, performed differently, performed sequentially, concurrently, or simultaneously, or altered into any desired sequence, as recognized by a person of skill in the art.

One or more embodiments of the present disclosure may be implemented in one or more processors. The term processor may refer to one or more processors and/or one or more processing cores. The one or more processors may be hosted in a single device or distributed over multiple devices (e.g. over a cloud system). A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium (e.g. memory). A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms “first”, “second”, “third”, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Although exemplary embodiments of systems and methods for on-demand data storage management have been specifically described and illustrated herein, many modifications and variations will be apparent to those skilled in the art. Accordingly, it is to be understood that systems and methods for on-demand data storage management constructed according to principles of this disclosure may be embodied other than as specifically described herein. The disclosure is also defined in the following claims, and equivalents thereof.

The systems and methods for processing storage transactions may contain one or more combination of features set forth in the below statements.

Statement 1. A method for managing a storage device, the method comprising: associating a first amount of a first storage device to a first client; detecting a first request associated with first data; detecting a second request associated with the first data; maintaining, for the first client, a log for the first request and the second request; identifying a trigger condition; based on identifying the trigger condition, computing a value based on the log; determining, based on the value, a second amount of the first storage device; and associating the second amount to the first client.

Statement 2. The method of Statement 1, wherein the first storage device includes a solid state drive.

Statement 3. The method of Statement 1, wherein the first request and the second request is for a same storage location.

Statement 4. The method of Statement 3, wherein the log records the storage location for the first request and the second request based on a criterion.

Statement 5. The method of Statement 4, wherein the value identifies value for the storage location based on the log.

Statement 6. The method of Statement 1, wherein the value identifies a rate of miss events.

Statement 7. The method of Statement 6, wherein the determining of the second amount of the first storage device includes: determining that the rate of miss events satisfies a criterion; based on the determining, identifying a second rate of miss events; and identifying the second amount based on the second rate of miss events.

Statement 8. The method of Statement 7, wherein the criterion includes a quality of service threshold, and the second amount satisfies the quality of service threshold.

Statement 9. The method of Statement 1 further comprising: determining a criterion for a second client; and based on determining the criterion for the second client: associating a third amount of the first storage device to the second client; and changing the third amount to a fourth amount based on the trigger condition.

Statement 10. The method of Statement 1 further comprising: determining a criterion for a second client; and based on determining the criterion for the second client, associating a third amount of the first storage device to the second client.

Statement 11. A storage device comprising: a storage medium; and a processor coupled to the storage medium, the processor having circuitry for: associating a first amount of a first storage device to a first client; detecting, at a first time period, a first request associated with first data; detecting, at a second time period, a second request associated with the first data; maintaining, for the first client, a log for the first request and the second request; identifying a trigger condition; based on identifying the trigger condition, computing a value based on the log; determining, based on the value, a second amount of the first storage device; and associating the second amount to the first client.

Statement 12. The system of Statement 11, wherein the first storage device includes a solid state drive.

Statement 13. The system of Statement 11, wherein the first request and the second request is for a same storage location.

Statement 14. The system of Statement 13, wherein the log is configured to record the storage location for the first request and the second request based on a criterion.

Statement 15. The system of Statement 14, wherein the value identifies value for the storage location based on the log.

Statement 16. The system of Statement 11, wherein the value identifies a rate of miss events.

Statement 17. The system of Statement 16, wherein the determining of the second amount of the first storage device includes: determining that the rate of miss events satisfies a criterion; based on the determining, identifying a second rate of miss events; and identifying the second amount based on the second rate of miss events.

Statement 18. The system of Statement 17, wherein the criterion includes a quality of service threshold, and the second amount satisfies the quality of service threshold.

Statement 19. The system of Statement 11, wherein the processor has circuitry for: determining a criterion for a second client; and based on determining the criterion for the second client: associating a third amount of the first storage device to the second client; and changing the third amount to a fourth amount based on the trigger condition.

Statement 20. The system of Statement 11, wherein the processor has circuitry for: determining a criterion for a second client; and based on determining the criterion for the second client, associating a third amount of the first storage device to the second client.

What is claimed is:

1. A method for managing a storage device, the method comprising:

allocating, by a processor, a first memory size of a first storage device to a first computing client;

detecting, by the processor, a first memory access request associated with first data from the first computing client;

detecting, by the processor, a second memory access request associated with the first data;

storing, by the processor, into a log, for the first computing client, a first memory reference for the first memory access request and a second memory reference for the second memory access request;

identifying, by the processor, a trigger condition;

based on identifying the trigger condition, determining, by the processor, a first miss ratio based on the first memory reference and the second memory reference in the log;

determining, by the processor, a function associating the first miss ratio to the first memory size;

determining, by the processor, based on the function, a second memory size of the first storage device associated to a second miss ratio lower than the first miss ratio; and allocating, by the processor, the second memory size to the first computing client.

2. The method of claim 1, wherein the first storage device includes a solid state drive.

3. The method of claim 1, wherein the first memory access request and the second memory access request is for a same storage location.

4. The method of claim 3, wherein the log records the storage location for the first memory access request and the second memory access request based on a criterion.

5. The method of claim 1, wherein the determining of the second memory size of the first storage device is based on determining that the first miss ratio satisfies a criterion.

6. The method of claim 5, wherein the criterion includes a quality of service threshold, and the second miss ratio satisfies the quality of service threshold.

7. The method of claim 1 further comprising:

determining a criterion for a second client; and based on determining the criterion for the second client:

associating a third amount of the first storage device to the second client; and changing the third amount to a fourth amount based on the trigger condition.

8. The method of claim 1 further comprising:

determining a criterion for a second client; and based on determining the criterion for the second client, associating a third amount of the first storage device to the second client.

9. A storage device comprising:

a storage medium; and a processor coupled to the storage medium, the processor having circuitry for:

allocating a first memory size of a first storage device to a first computing client;

detecting, at a first time period, a first memory access request associated with first data from the first computing client;

detecting, at a second time period, a second memory access request associated with the first data;

storing into a log for the first computing client, a first memory reference for the first memory access request and a second memory reference for the second memory access request;

identifying a trigger condition;

based on identifying the trigger condition, determining a first miss ratio based on the first memory reference and the second memory reference in the log;

determining a function associating the first miss ratio to the first memory size;

determining, based on the function, a second memory size of the first storage device associated to a second miss ratio lower than the first miss ratio; and allocating the second memory size to the first computing client.

10. The storage device of claim 9, wherein the first storage device includes a solid state drive.

11. The storage device of claim 9, wherein the first memory access request and the second memory access request is for a same storage location.

12. The storage device of claim 11, wherein the log is configured to record the storage location for the first memory access request and the second memory access request based on a criterion.

13. The storage device of claim 9, wherein the determining of the second memory size of the first storage device is based on determining that the first miss ratio satisfies a criterion.

14. The storage device of claim 13, wherein the criterion includes a quality of service threshold, and the second miss ratio satisfies the quality of service threshold.

15. The storage device of claim 9, wherein the processor has circuitry for:

determining a criterion for a second client; and based on determining the criterion for the second client:

associating a third amount of the first storage device to the second client; and changing the third amount to a fourth amount based on the trigger condition.

16. The storage device of claim 9, wherein the processor has circuitry for:

determining a criterion for a second client; and based on determining the criterion for the second client, associating a third amount of the first storage device to the second client.

* * * * *